(12) United States Patent
Huch

(10) Patent No.: US 7,061,933 B2
(45) Date of Patent: Jun. 13, 2006

(54) MULTIPLEXER BUS WITH LOCAL BUS NODES

(75) Inventor: Martin Huch, München (DE)

(73) Assignee: Infineon Technologies AG, Munich (DE)

( * ) Notice: Subject to any disclaimer, the term of this patent is extended or adjusted under 35 U.S.C. 154(b) by 904 days.

(21) Appl. No.: 09/954,413

(22) Filed: Sep. 17, 2001

(65) Prior Publication Data

US 2002/0067734 A1    Jun. 6, 2002

Related U.S. Application Data

(63) Continuation of application No. PCT/DE00/00594, filed on Mar. 1, 2000.

(30) Foreign Application Priority Data

Mar. 17, 1999  (DE) ................................ 199 11 954

(51) Int. Cl.
  *H04L 12/66* (2006.01)
(52) U.S. Cl. ...................................... 370/463
(58) Field of Classification Search ................ 370/257, 370/362, 364, 365, 402, 408, 423, 425, 451, 370/489, 463
See application file for complete search history.

(56) References Cited

U.S. PATENT DOCUMENTS

| 4,903,280 A |   | 2/1990 | Lang et al. |
| 5,127,067 A | * | 6/1992 | Delcoco et al. ............... 385/24 |
| 5,155,387 A |   | 10/1992 | Fletcher et al. |
| 5,339,307 A |   | 8/1994 | Curtis |
| 5,740,174 A | * | 4/1998 | Somer ......................... 370/402 |

FOREIGN PATENT DOCUMENTS

GB           1 561 962        3/1980

OTHER PUBLICATIONS

A. Blum: "Checking Of Tristate Drivers", *IBM Technical Disclosure Bulletin*, vol. 24, No. 12, May 1982, pp. 6492-6493.

* cited by examiner

*Primary Examiner*—Kwang Bin Yao
(74) *Attorney, Agent, or Firm*—Laurence A. Greenberg; Werner H. Stemer; Ralph E. Locher

(57) ABSTRACT

The invention relates to a multiplexer bus comprising local bus nodes. In order to connect a plurality of transmitting-receiving circuits, the latter are connected to locally distributed bus nodes which, in turn, can be connected to additional transmitting-receiving circuits or to bus nodes. The bus nodes contain a first circuit for relaying a data signal if a control signal is transmitted in parallel with the data signal, and a second circuit for relaying the control signal.

12 Claims, 3 Drawing Sheets

MULTIPLEXER BUS WITH LOCAL BUS NODES

CROSS-REFERENCE TO RELATED APPLICATION

This application is a continuation of copending International Application No. PCT/DE00/00594, filed Mar. 1, 2000, which designated the United States.

BACKGROUND OF THE INVENTION

1. Field of the Invention

The invention relates to a circuit arrangement of multiplexers, that is a bus circuit of multiplexers for connecting transceiver circuits with connecting lines for outputting and receiving a data signal and a control signal that characterizes a data signal.

The circuit described herein is to be used, in particular, to connect a number of transceiver circuits to one another in such a manner that they are capable of communicating with one another. This task is frequently handled by so-called tristate buses but these have some disadvantages. Thus, the capacitive loading on the bus line—caused by disconnected transmit circuits of the bus users—is proportional to the transmit power of the transmitting bus user. The ratio between transmit power and capacitive loading can not, therefore, be improved selectively by design measures but depends on technology parameters and the number of transceiver circuits involved. With a given technology, the transmission speed, which can be achieved is thus a function of the number of connected transceiver circuits alone. In particular, the transmission speed is reduced with increased numbers of bus users.

Furthermore, the use of a tristate bus requires relatively elaborate drive logic. Since the simultaneous transmission by two bus users would be equivalent to a short circuit, it must be ensured that two transceiver circuits never simultaneously place a signal on the bus. When switching from one transceiver circuit to the other one, a pause must be inserted in each case wherein no bus user at all is active and this pause must be synchronized via a central clock. The problem arises especially in the case of complex bus systems that it is no longer possible to ensure that the clock signals are simultaneously received by all transceiver circuits. Thus, the pause must be correspondingly large enough to ensure that no two bus users are transmitting at the same time even with such delay differences of clock signals. Furthermore, the dimensioning and verification in the development of tristate buses is only very inadequately supported by currently available CAD tools.

To avoid disadvantages of this type, multiplexers are also used instead of tristate buses. In principle, two equivalent solutions to the problem are known. In the first case, each transceiver circuit is given its own multiplexer at its input by means of which it can determine from which transceiver circuit it wishes to receive signals. In the second case, each transceiver circuit sends its signal to a centrally arranged distributor circuit, which selects one of the incoming signals and forwards it to all connected transceiver circuits.

These two possibilities also provide some problems. In particular, the two solutions do not occupy optimum areas but need a relatively large spatial area since a great number of connecting lines must be run between the individual transceiver circuits and the associated multiplexers. The space requirement often exceeds that of an equivalent tristate bus by a multiple. Furthermore, a given structure is restricted to a certain number of transceiver circuits and can thus not be expanded very flexibly. If another bus user is to be added, the entire structure of the connecting lines must be adapted to this new situation.

SUMMARY OF THE INVENTION

It is accordingly an object of the invention to provide a configuration of multiplexers for connecting a number of transceiver circuits, which overcomes the above-mentioned disadvantages of the heretofore-known devices and methods of this general type and which has the least possible space requirement and can be adapted to a different number of participating transceiver circuits with little effort.

With the foregoing and other objects in view there is provided, in accordance with the invention, a bus circuit, comprising:

a plurality of bus nodes;

a plurality of transceiver circuits outputting and receiving data signals and control signals characterizing the data signals;

the transceiver circuits having connecting lines connecting each of the transceiver circuits to a respective one of the bus nodes, and wherein the respective the bus nodes are in turn connected to a further transceiver circuit or a further bus node;

each of the bus nodes having data signal input lines for receiving data signals and associated control signal input lines for receiving control signals characterizing a data signal from one of a respective transceiver circuit or a respective one of the bus nodes;

data signal output lines for outputting data signals and associated control signal output lines for outputting control signals characterizing a data signal to a respectively connected transceiver circuit or a respective one of the bus nodes;

a first circuit for forwarding a received data signal to a respectively connected transceiver circuit or a bus node if a control signal is received on the associated control signal input line at the same time as the data signal; and a second circuit for forwarding a received control signal to all connected transceiver circuits or bus nodes except to the transceiver circuit or bus node from which the control signal has been received.

In other words, there is provided a bus circuit of multiplexers for connecting transceiver circuits with connecting lines for outputting and receiving a data signal and a control signal characterizing a data signal. The transceiver circuits are only connected via their connecting lines to a bus node which, in turn, is itself connected to other transceiver circuits or other bus nodes.

The circuit according to the invention is distinguished, in particular, by the fact that the connection between the various transceiver circuits is implemented by a number of locally distributed bus nodes instead of by a central distribution circuit. An individual transceiver circuit is only directly connected to the nearest bus node, which, in turn, has connecting lines to other transceiver circuits or bus nodes.

In this manner, a relatively short total length of data lines is achieved and the space requirement of this bus circuit is distinctly less than in the case of the known multiplexer buses. A further advantage can be seen in the fact that the structure of all bus nodes is essentially identical and the expenditure for implementing even relatively complex bus circuits with many transceiver circuits connected to them is low. Due to the modular structure of this solution, it is easily possible to carry out local modifications, which do not influence the other areas of the bus circuit. In particular, the number of participating transceiver circuits can be increased or decreased without difficulties.

In accordance with an added feature of the invention, the first circuit is configured to forward a data signal to all connected transceiver circuits and bus nodes. Advantageously, the first circuit is formed as an AND/OR gate having inputs connected to the data signal input lines and the control signal input lines and an output connected to all the data signal output lines.

In accordance with an additional feature of the invention, the first circuit is configured to forward a data signal to all connected transceiver circuits or bus nodes except to the transceiver circuit or the bus node from which the control signal is received. In a preferred implementation, the first circuit comprises AND/OR gates having outputs each connected to a data signal output line leading to a particular transceiver circuit or bus node and having inputs only connected to the data signal input lines and the control signal input lines originating from a respectively other transceiver circuit or bus node.

In accordance with another feature of the invention, the second circuit is formed of OR gates.

In accordance with a further feature of the invention, a control logic is provided that ensures that in each case only a single transceiver circuit is sending signals at a particular time.

In accordance with again an added feature of the invention, a control logic controls a forwarding of data signals into the bus node.

In accordance with again an additional feature of the invention, the bus nodes are each connected to an identical number of transceiver circuits and bus nodes.

In accordance with again another feature of the invention, the bus nodes are arranged in a star form.

In accordance with again a further feature of the invention, there are provided buffers connected in the data signal output lines.

In accordance with a concomitant feature of the invention, the data signals carry an identification characterizing the transmitting transceiver circuit.

Other features which are considered as characteristic for the invention are set forth in the appended claims. The individual bus nodes can be formed, for example, by a single AND/OR gate which can be easily produced.

Although the invention is illustrated and described herein as embodied in multiplexer bus with local bus nodes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
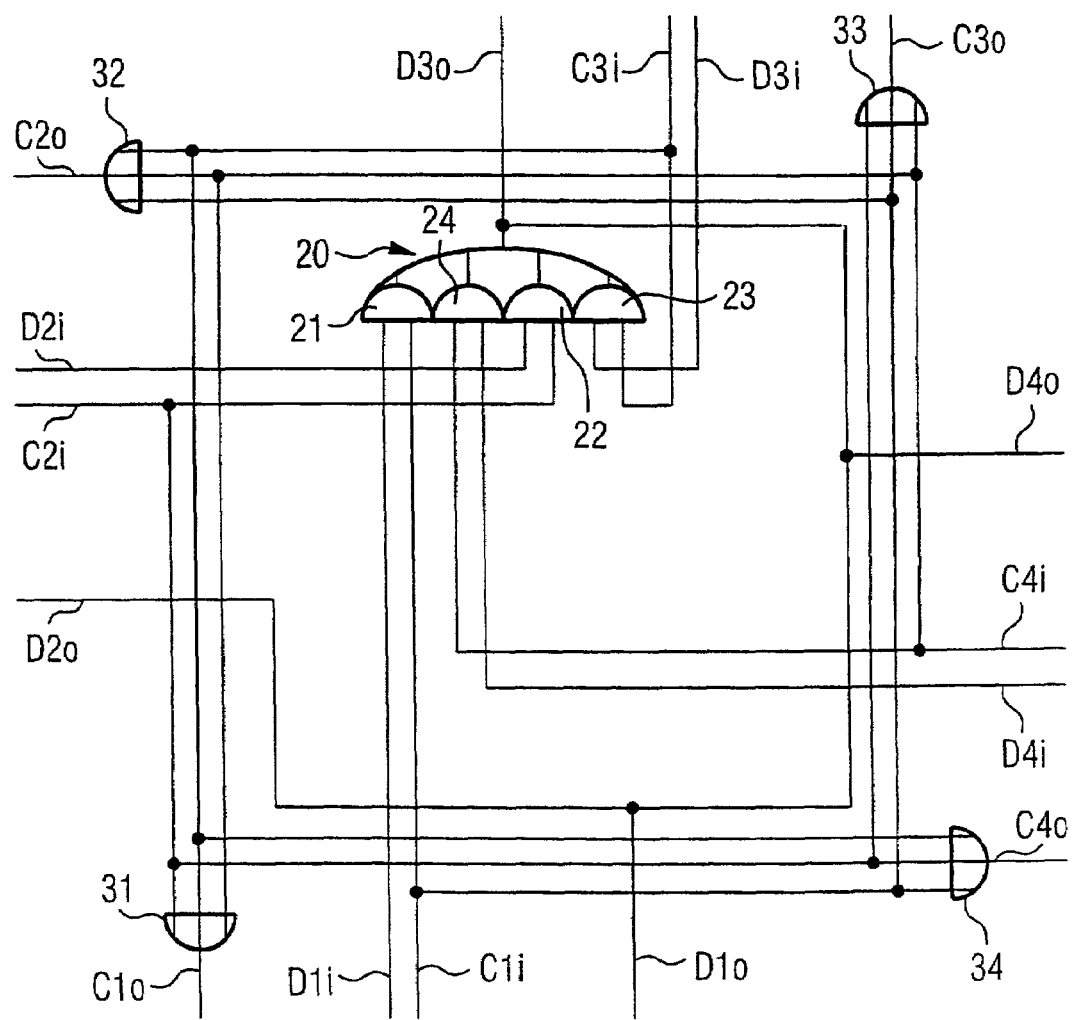
FIG. 1 is a circuit diagram of a bus node according to the invention with four connected transceiver circuits or, respectively, bus nodes.

Referring now to the figures of the drawing in detail and first, particularly, to FIG. 1 thereof, there is shown the structure and the function of an individual bus node, which is connected to four neighboring elements in this case. These neighboring elements can be either further similar bus nodes or transceiver circuits. The central switching element of such a bus node is an AND/OR gate 20. This AND/OR gate 20 has for each neighboring element to which the node is connected in each case one AND stage 21, 22, 23, 24, the two inputs of which are connected to a data signal input line and a control signal input line. In the case shown, for example, the inputs of the first AND stage 21 are connected to the data signal input line D1$i$ and the control signal input line C1$i$ of the first neighboring element. In addition, a data signal output line (D1$o$, D2$o$ etc.) and a control signal output line (C1$o$, C2$o$ etc.) in each case leads to each neighboring element.

It should be noted that the data signal input and data signal output lines diagrammatically shown only by a line can easily be formed of a number of parallel lines in accordance with the width of the bus. In this case, such a bus node has a separate AND/OR gate for each of the parallel data lines, the control lines, which also consist of a single line, branching to the AND/OR gates since a control signal always applies to a complete bus signal. For the sake of simplicity, however, it will be assumed in the text, which follows that the data lines only consist of a single line.

The neighboring elements are designed in such a manner that, during the transmission of a data signal via the data signal input lines D1$i$ to D4$i$ to the bus node shown, they also in each case simultaneously output a control signal via the control signal input lines C1$i$ to C4$i$. If, in contrast, they receive a signal via the control signal output lines C1$o$ to C4$o$, this means that, at the same time, a signal is also being sent to them via the respective data signal output lines D1$o$ to D4$o$.

In the text, which follows, it will be assumed that only the first neighboring element is sending a signal to the bus node via the lines D1$i$ and C1$i$ whereas the other three neighboring elements happen to not be sending. Since thus no signal is arriving from the three control signal input lines C2$i$, C3$i$ and C4$i$, the three corresponding AND stages 22, 23 and 24 are cut off whereas the AND stage 21 is enabled by setting the control signal input line C1$i$. The output of the AND/OR gate 20 thus corresponds to the data signal of the first neighboring element arriving via line D1$i$.

The output of the AND/OR gate 20 then branches into the four data signal output lines D1$o$ to D4$o$ so that the data signal is forwarded to all four adjacent elements. However, so that these elements will actually accept the data signal as the signal to be received and—if these are further bus nodes—forward it to the nearest neighboring elements or transceiver circuits, the simultaneous reception of a control signal is also necessary. This is achieved by the fact that the control signal input line C1$i$ branches before the AND stage 21 and opens into the control signal output lines C2o, C3o and C4o of the other three neighboring elements.

As can also be seen in the circuit diagram shown in FIG. 1, each control signal output line C1o to C40 is in each case preceded by an OR gate 31, 32, 33 and 34, respectively, into which branches of the control signal input lines of the in each case other three neighboring elements open. In the bus node shown, only a distinction is thus made whether a data signal proceeding in a data signal output line D1o to D4o originates from one of the three other connected elements or not. In the case under discussion, where only the first connected element is transmitting, this element does not receive any further control signal on its corresponding control signal output line C1o and will thus not even process the data signal further. This ensures that the signal of a single transmitting transceiver circuit will only propagate in one direction and not pass through some unwanted feedback loops.

Figure 2:
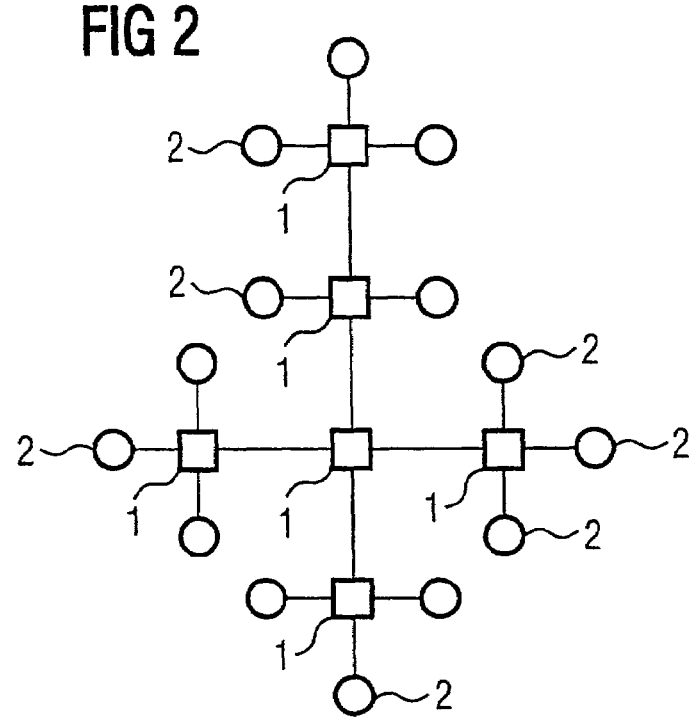
FIG. 2 is a diagram of an exemplary embodiment of a bus circuit with 14 connected transceiver circuits.

FIG. 2 shows how a bus connection between 14 transceiver circuits can be actually implemented by means of the bus nodes explained with reference to FIG. 1—that is to say nodes having connections to four neighboring elements. The reference symbol 1 designates the bus nodes described above and the transceiver circuits are identified with the reference symbol 2. The connecting lines between the bus nodes 1 or transceiver circuits 2, respectively, represent the four lines (data signal input and data signal output line and control signal input and control signal output line) as a whole. The entire bus system is designed in such a manner that a signal, which is sent out by one of the transceiver circuits 2 is distributed over the entire arrangement so that it can be received by all other transceiver circuits 2.

Since, according to what has been described above, it is unimportant for a bus node 1 whether incoming data and control signals originate from an adjacent further bus node 1 or directly from a connected transceiver circuit 2, the number of transceiver circuits 2 connected directly to a bus node 1 differs. In the star-shaped arrangement shown, the more centrally arranged bus nodes 1 are only connected directly to a few transceiver circuits 2, and in some cases not at all, whereas the bus nodes 1 located in the edge region have a number of direct connections to them.

Considering FIG. 2, it is also understandable that the space requirement of such an embodiment of the multiplexer bus according to the invention is much less than in the case of known solutions. In particular, the total length of connecting lines is less by a multiple than in the case where each transceiver circuit 2 is directly connected to all other transceiver circuits 2.

Figure 3:
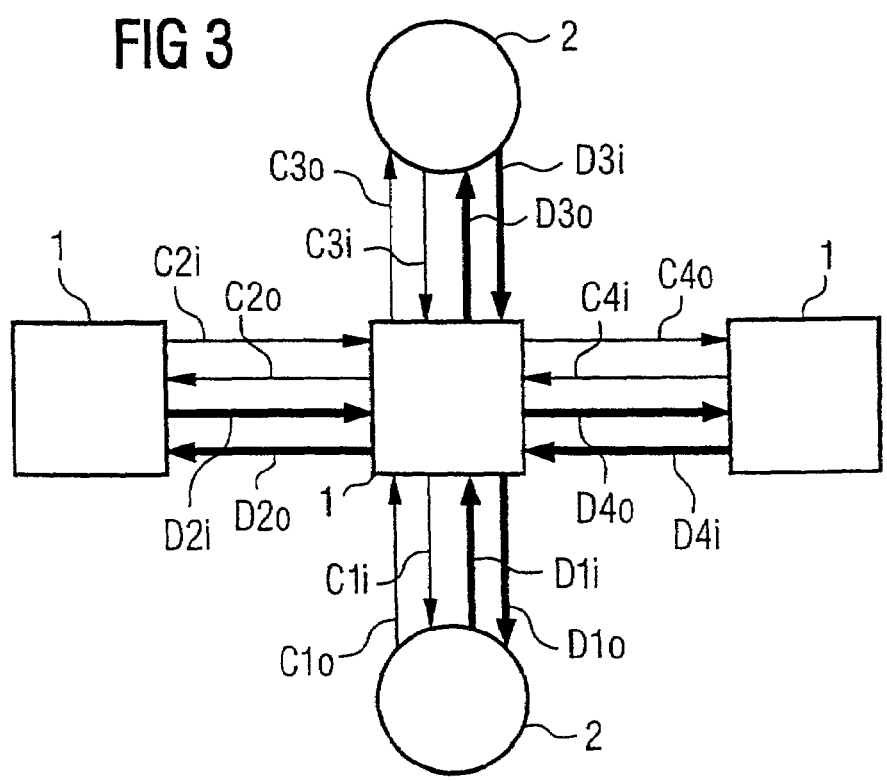
FIG. 3 is a schematic diagram of the course of the data signal and control signal lines between a central bus node and two further bus nodes connected to it and two transceiver circuits.

FIG. 3 again diagrammatically shows enlarged the course of the data signal and control signal lines between a central bus node 1 and two connected further bus nodes 1 and two transceiver circuit 2. The reference symbols used there for the various lines correspond to those of FIG. 1.

Figure 4:
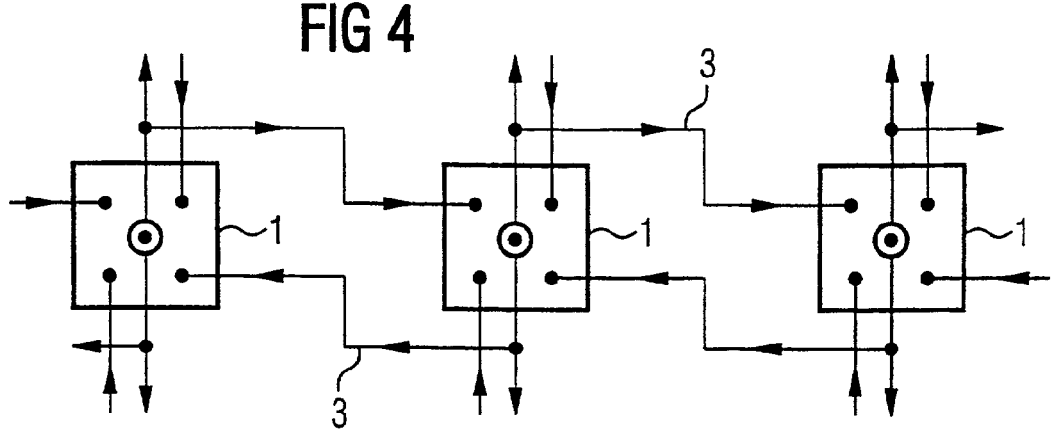
FIG. 4 is a schematic diagram of the course of the data lines between three interconnected bus nodes.

The actual course of the data lines 3 between three interconnected bus nodes is shown in FIG. 4. This figure once more shows clearly that a maximum of two data lines 3—the second one for transporting data in the opposite direction— are running in any direction of the bus. No further data lines are needed for connecting the two bus nodes 1 on the outside.

A further advantage of using such bus nodes 1 can be seen in the fact that the signals are "refreshed" time and again by the AND/OR gates 20. Since the signal delay increases as the square of the line length in the case of an uninterrupted line, a shortening of the signal delays is also achieved with the bus system proposed. This effect can be additionally supported by non-illustrated buffers that are connected following the AND/OR gates 20 in the signal flow direction.

As has already been noted above, it is also easily possible to change the number of connected bus users with this solution. To add a further transceiver circuit 2 in the bus circuit shown in FIG. 2, for example, only one of the transceiver circuits 2 needs to be replaced by a bus node 1 by means of which the replaced transceiver circuit 2 and the new ones are then connected. The remaining transceiver circuits 2 in other areas of the arrangement are not affected by this change. Thus, the entire system can be handled much more flexibly than in the previously known embodiments of multiplexer buses.

Naturally, the bus nodes 1 used are not restricted to connecting four neighboring elements. Another number of connections is possible at any time and, in particular, six neighboring elements present themselves in the case of a spatial structure of the bus. Similarly, the number of connections to neighboring elements within a single bus system can vary and, naturally, a composition of only the same types of bus node 1 further simplifies the overall structure. Furthermore, the transceiver circuits 2 and the bus nodes 1 do not need to be arranged in a star shape as shown. To connect 14 transceiver circuits 2, many solutions are conceivable, for example chain-shaped, tree-shaped or pyramid-shaped arrangements. The overall system can thus be structured in a very flexible manner as a result of which, for example, a given spatial area can be optimally utilized. The result of the arrangement shown in FIG. 2, however, is advantageously that the line length is relatively short in comparison with the chain-shaped solution even between the two transceiver circuits 2 which are spaced apart most widely.

Until now, only the ideal case has been discussed that, at a particular time, only one transceiver circuit 2 in each case sends a data signal to the bus. This can be achieved, for example, by a central control logic controlling all transceiver circuits 2 and deciding which of the transceiver circuits 2 is allowed to transmit at this time. Since the task of the control logic is exactly the same in this case as when a tristate bus is used, a control logic known from there can also be used in the case of the multiplexer bus according to the invention proposed here. However, other possibilities for controlling the entire bus are also conceivable. For example, a control logic, instead of controlling the transceiver circuits 2, could influence the bus nodes 1 and there control the enabling of the various AND stages. This control can then be arranged centrally or also be distributed locally. It would also be conceivable to design the control logic in such a manner that the signals are only forwarded in certain directions and areas of the bus.

Usually, when such a control logic is used, it never happens that two transceiver circuits 2 simultaneously transmit a signal to the bus. If this should happen, nevertheless, it can lead to a corrupted result for the duration of the simultaneity. If, for example, at least one of the transceiver circuits 2 is sending a 1, all bus users also receive this 1 on their data lines independently of the data signals of the other transceiver circuits 2 which are also transmitting. In contrast to a tristate bus, however, this will not lead to a short circuit.

However, when two transceiver circuits 2 are transmitting simultaneously, feedback loops can occur as a result of which a data signal is continuously being exchanged between two adjacent bus nodes 1. In this case, a 1 sent once would stay on the data lines of the bus even if, in the meantime, all transceiver circuits 2 are again sending a 0. This state would persist for as long as no more than one transceiver circuit 2 is outputting a control signal alone. Feedback loops of this type will never become active in the relevant operating states, that is to say when only one transceiver circuit 2 is sending in each case. However, its theoretical occurrence produces problems in the testing of newly designed structures by means of CAD tools.

Figure 5:
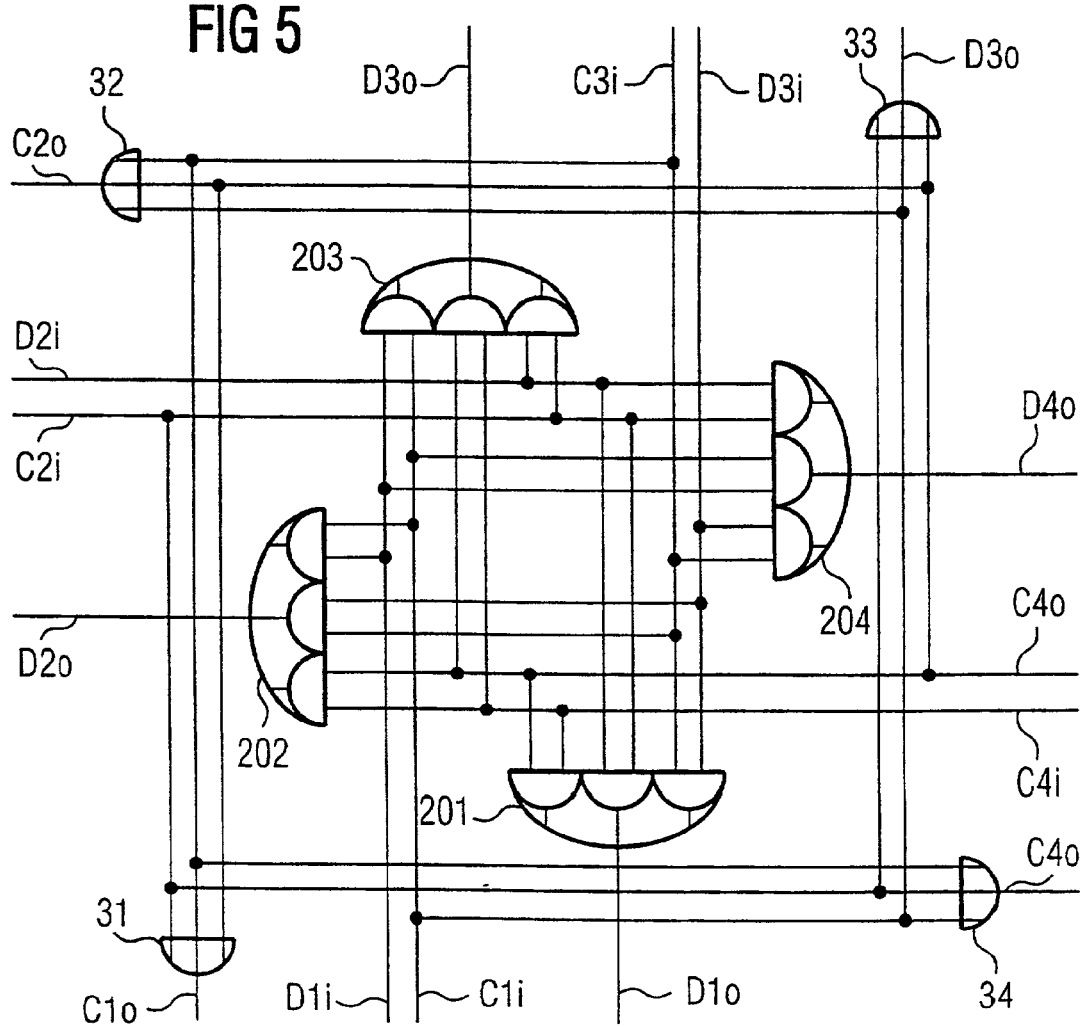
FIG. 5 is a circuit diagram of a further development of the bus node shown in FIG. 1.

The occurrence of such feedback loops can be avoided by means of the further development of a bus node shown in FIG. 5. This further development is distinguished by the fact that, instead of the central AND/OR gate 20 in FIG. 1, four AND/OR gates 201 to 204 are now used which are in each case connected in series with one of the four data signal output lines D1o to D4o. However, the number of AND stages in these AND/OR gates 201 to 204 is less by one than the number of neighboring elements, the input signals of the AND stages of a particular AND/OR gate, the output of which is connected to a data signal output line leading to one of the neighboring elements, only originating from the remaining neighboring elements and not from this one itself. In the actual example shown according to FIG. 5, this means that the AND/OR gate 201 belonging to the data signal output line D1o is only connected to the data signal input lines of neighboring elements 2, 3 and 4.

The consequence is that it is not only the control signal, which is prevented from going back to the transmitting neighboring element as in the circuit in FIG. 1 but also the data signal. Even if two transceiver circuits 2 would now output control signals at the same time, a data signal would propagate only once in one direction and no longer circulate between two bus nodes 1. In the normal operating case where in each case only one of the transceiver circuit 2 is active, however, both circuits specified are equivalent.

If the data signal lines consist of a number of parallel lines, it is possible to modify the bus system in such a manner that the transceiver circuits 2 can recognize which bus user is currently transmitting. This can be done, for example, by priorities being allocated to some data signal lines, the transceiver circuits 2 in each case transmitting an additional 1 on the line of their priority during the transmission. The receiving transceiver circuits 2 can then recognize where the corresponding signal is originating from and can derive from this a priority decision.

It can also be taken into consideration that in the case of a bus line consisting of a number of parallel lines, some bus users do not need all of these lines. If, for example, the first eight lines are only used for transferring memory addresses, data signals will never be transmitted or received on these by some bus users in accordance with their function. On the other hand, it may occur that some of the bus users only transmit or only receive in principle. In these cases, it is sufficient if signals from the bus nodes are only received from certain directions or, respectively, forwarded in certain directions. The structure of the bus nodes can be adapted to account for this. For example, the corresponding superfluous AND stages of the AND/OR gates, or complete AND/OR gates in the case of the bus nodes according to FIG. 5, can be omitted.

Finally, it should be noted that the effect according to the invention of the individual bus nodes can also be achieved by other logic circuits—for example NAND-NAND structures—instead of by the AND/OR gates 20 or 201 to 204, respectively, shown. It would also be conceivable, for example, to configure the entire bus system in negative logic and then to use OR/AND gates or NOR/NOR structures corresponding to the AND/OR gates.

I claim:

1. A bus circuit, comprising:
a plurality of bus nodes;
a plurality of transceiver circuits outputting and receiving data signals and control signals characterizing the data signals;
said transceiver circuits having connecting lines connecting each of said transceiver circuits to a respective one of said bus nodes, and wherein the respective said bus nodes are in turn connected to a further transceiver circuit or a further bus node;
each of said bus nodes having
data signal input lines for receiving data signals and associated control signal input lines for receiving control signals characterizing a data signal from one of a respective transceiver circuit or a respective one of said bus nodes;
data signal output lines for outputting data signals and associated control signal output lines for outputting control signals characterizing a data signal to a respectively connected transceiver circuit or a respective one of said bus nodes;
a first circuit for forwarding a received data signal to a respectively connected transceiver circuit or a bus node if an associated control signal is received on the associated control signal input line at the same time as the data signal; and
a second circuit for forwarding a received control signal to all connected transceiver circuits or bus nodes except to said transceiver circuit or bus node from which the control signal has been received.

2. The bus circuit according to claim 1, wherein said first circuit is configured to forward a data signal to all connected transceiver circuits and bus nodes.

3. The bus circuit according to claim 2, wherein said first circuit is formed as an AND/OR gate having inputs connected to the data signal input lines and the control signal input lines and an output connected to all said data signal output lines.

4. The bus circuit according to claim 1, wherein said first circuit is configured to forward a data signal to all connected transceiver circuits or bus nodes except to the transceiver circuit or the bus node from which the control signal is received.

5. The bus circuit according to claim 4, wherein said first circuit comprises AND/OR gates having outputs each connected to a data signal output line leading to a particular transceiver circuit or bus node and having inputs only connected to said data signal input lines and said control signal input lines originating from a respectively other transceiver circuit or bus node.

6. The bus circuit according to claim 1, wherein said second circuit comprises a number of OR gates.

7. The bus circuit according to claim 1, which comprises a control logic ensuring that in each case only a single transceiver circuit is sending signals at a particular time.

8. The bus circuit according to claim 1, which comprises a control logic for controlling a forwarding of data signals into said bus node.

9. The bus circuit according to claim 1, wherein said bus nodes are each connected to an identical number of transceiver circuits and bus nodes.

10. The bus circuit according to claim 1, wherein said bus nodes are arranged in a star form.

11. The bus circuit according to claim 1, which comprises buffers connected in said data signal output lines.

12. The bus circuit according to claim 1, wherein the data signals carry an identification characterizing the transmitting transceiver circuit.

* * * * *